(12) United States Patent
Renkes et al.

(10) Patent No.: US 10,185,737 B2
(45) Date of Patent: *Jan. 22, 2019

(54) DISTRIBUTED TRANSACTION MANAGEMENT WITH TOKENS

(71) Applicants: Frank Renkes, Rauenberg (DE); Juchang Lee, Seoul (KR)

(72) Inventors: Frank Renkes, Rauenberg (DE); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 70 days.

This patent is subject to a terminal disclaimer.

(21) Appl. No.: 14/642,941

(22) Filed: Mar. 10, 2015

(65) Prior Publication Data

US 2015/0178343 A1 Jun. 25, 2015

Related U.S. Application Data

(63) Continuation of application No. 12/898,633, filed on Oct. 5, 2010, now Pat. No. 9,009,182.

(51) Int. Cl.
*G06F 17/30* (2006.01)

(52) U.S. Cl.
CPC .. *G06F 17/30362* (2013.01); *G06F 17/30321* (2013.01); *G06F 17/30371* (2013.01)

(58) Field of Classification Search
CPC ......... G06F 17/30362; G06F 17/30321; G06F 17/30371
USPC ....................................................... 707/690
See application file for complete search history.

(56) References Cited

U.S. PATENT DOCUMENTS

| | | | |
|---|---|---|---|
| 6,604,102 B2 | 8/2003 | Klein et al. | |
| 8,140,395 B2 | 3/2012 | Murphy et al. | |
| 2002/0038313 A1* | 3/2002 | Klein | G06F 17/30492 |
| 2002/0133507 A1 | 9/2002 | Holenstein et al. | |
| 2004/0249838 A1* | 12/2004 | Hinshaw | G06F 17/30356 |
| 2005/0097149 A1 | 5/2005 | Vaitzblit et al. | |
| 2006/0167960 A1* | 7/2006 | Lomet | G06F 17/30353 |

(Continued)

OTHER PUBLICATIONS

Gray et al. "The Basics of Transaction Processing." Transaction Processing: Concepts and Techniques. San Mateo, California: Morgan Kaufman Publishers. (1993):1-44.

(Continued)

*Primary Examiner* — Mark D Featherstone
*Assistant Examiner* — Faezeh Forouharnejad
(74) *Attorney, Agent, or Firm* — Mintz Levin Cohn Ferris Glovsky and Popeo, P.C.

(57) ABSTRACT

A system, method and computer product for managing distributed transactions of a database. A transaction manager is provided for each of a plurality of transactions of the database. Each transaction manager is configured to perform functions that include generating a transaction token that specifies data to be visible for a transaction on the database. The database contains both row and column storage engines, and the transaction token includes a transaction identifier (TID) for identifying committed transactions and uncommitted transactions. A last computed transaction is designated with a computed identifier (CID), record-level locking of records of the database is performed using the TID and CID to execute the transaction, and the plurality of transactions of the database are executed with each transaction manager.

6 Claims, 3 Drawing Sheets

(56) References Cited

U.S. PATENT DOCUMENTS

| | | |
|---|---|---|
| 2007/0083569 A1* | 4/2007 | Wong .............. G06F 17/30371 |
| 2008/0195672 A1 | 8/2008 | Hamel et al. |
| 2008/0294863 A1* | 11/2008 | Faerber .............. H03M 7/3084 |
| | | 711/170 |
| 2009/0094236 A1* | 4/2009 | Renkes ............ G06F 17/30336 |
| 2009/0119349 A1 | 5/2009 | Edlund et al. |
| 2010/0036831 A1 | 2/2010 | Vemuri et al. |
| 2010/0070377 A1* | 3/2010 | Williams .............. G06Q 20/06 |
| | | 705/26.1 |
| 2010/0106753 A1 | 4/2010 | Prabhakaran et al. |
| 2010/0198800 A1 | 8/2010 | Nettleton et al. |
| 2010/0281005 A1 | 11/2010 | Carlin et al. |

OTHER PUBLICATIONS

Gray et al. "Isolation Concepts." Transaction Processing: Concepts and Techniques. San Mateo, California: Morgan Kaufman Publishers, (1993):373-445.

U.S. Appl. No. 12/898,633, filed Oct. 5, 2010, Frank Renkes et al.

\* cited by examiner

DISTRIBUTED TRANSACTION MANAGEMENT WITH TOKENS

RELATED APPLICATION

This application is a continuation of and claims priority under 35 U.S.C. § 120 to U.S. patent application Ser. No. 12/898,633 filed Oct. 5, 2010, the entire contents of which are hereby incorporated by reference herein.

BACKGROUND

This disclosure relates generally to a transaction manager for database transactions in a data processing system, and more particularly to distributed transaction management with tokens.

Conventional database transactions occur between a transactional engine and a database, in which the transactional engine queries the database to retrieve data or to insert, update or delete records to or from the database. However, problems may occur when database transactions become distributed, i.e. where two transactional engines are used or where the transaction runs on more than one physical instance. These problems can include difficulty in identifying committed and uncommitted transactions, and where transactions are in their computational progress. For example, even though two transactions are executed in parallel, a transaction later in time may need to know which of the records have been committed in an earlier transaction so as to have access to correct data.

SUMMARY

In general, this document discloses a distributed transaction management system and method, using a transaction manager with tokens.

In one aspect, a computer-implemented method for managing distributed transactions of a database is presented. The method includes providing a transaction manager for each of a plurality of transactions of the database. Each transaction manager is configured to perform functions that include generating a transaction token that specifies data to be visible for a transaction on the database. The database contains both row and column storage engines, and the transaction token includes a transaction identifier (TID) for identifying committed transactions and uncommitted transactions. The method further includes designating a last computed transaction with a computed identifier (CID), performing record-level locking of records of the database using the TID and CID to execute the transaction, and executing the plurality of transactions of the database with each transaction manager.

In another aspect, a system for managing distributed transactions of a database is presented. The system includes a transaction manager provided for each of a plurality of transactions of the database, and a transaction token generated by each transaction manager. Each transaction token specifies data to be visible for a transaction on the database, the database containing both row and column storage engines, the transaction token including a transaction identifier (TID) for identifying committed transactions and uncommitted transactions. Each transaction manager is configured to designate a last computed transaction with a computed identifier (CID), perform record-level locking of records of the database using the TID and CID to execute the transaction, and execute the plurality of transactions of the database with each transaction manager.

In yet another aspect, a computer program product for managing distributed transactions of a database is presented. The product includes a storage medium readable by at least one processor and storing instructions for execution by the at least one processor for providing a transaction manager for each of a plurality of transactions of the database. Each transaction manager is configured to perform functions including generating a transaction token that specifies data to be visible for a transaction on the database, the database containing both row and column storage engines, the transaction token including a transaction identifier (TID) for identifying committed transactions and uncommitted transactions, designating a last computed transaction with a computed identifier (CID), and performing record-level locking of records of the database using the TID and CID to execute the transaction. The product further includes executing, by the at least one processor, the plurality of transactions of the database with each transaction manager.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a transaction manager (TM) for a database. The TM includes both a row store engine and a column store engine. In certain implementations, the TM supports full ACID properties for transactions, multi-version concurrency control, and transactional consistency across the column and row storage engines. The TM also supports distributed (i.e. multi-instance update) transactions, and can generate an in-doubt transaction list for atomic multi-host transaction commits. Further still, in some implementations, the TM preferably is optimization focused on local-only transactions.

In operation, for each transaction the TM issues a transaction token that specifies what data is visible for the transaction. The transaction token includes a transaction identifier (TID) that can be used to identify the last computed identifier (CID) as well as identify committed and uncommitted transactions.

Figure 1:
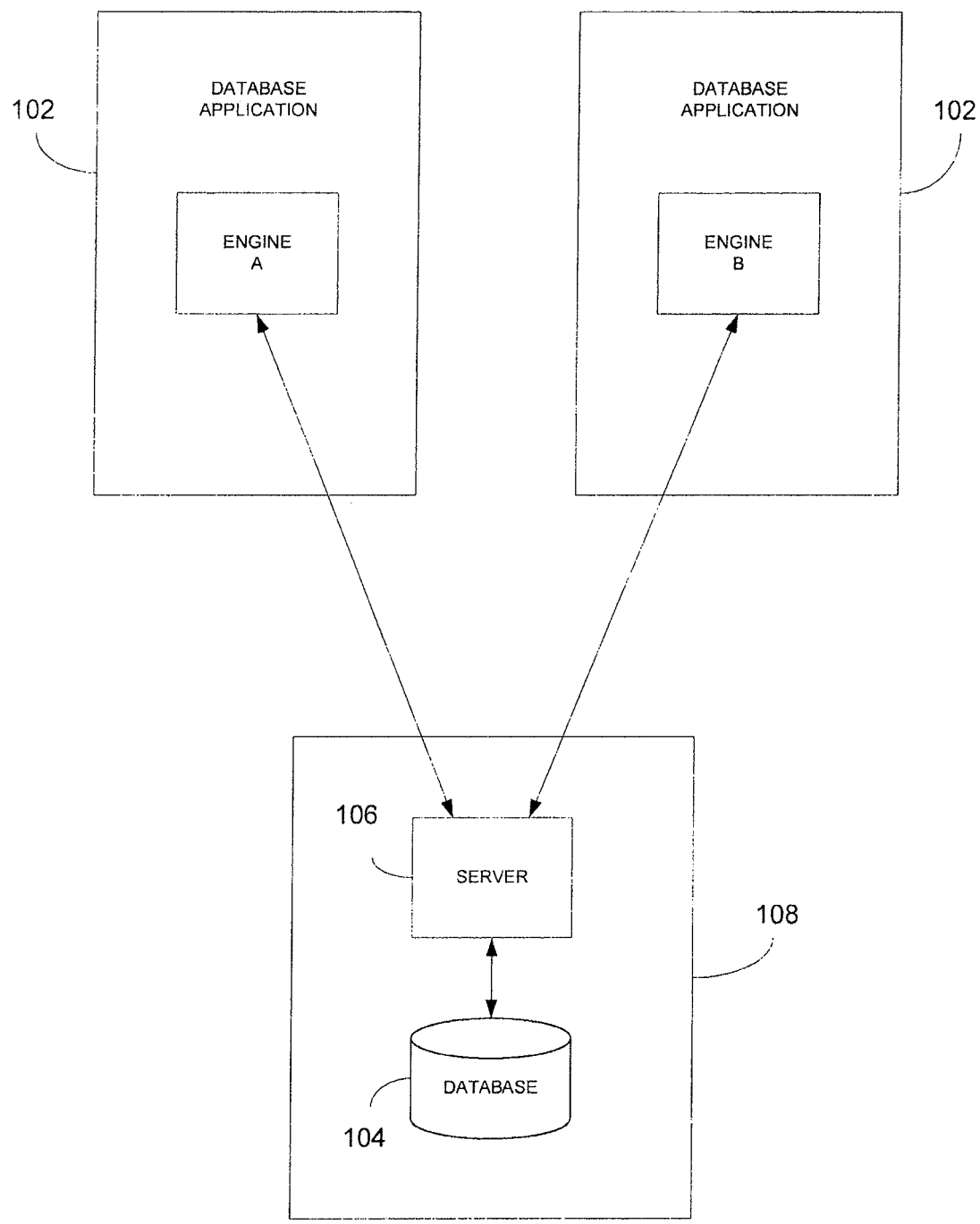
FIG. 1 shows a computing system configured to perform distributed database transactions.

FIG. 1 shows a computing system 100 in which two separate computing engines of one or more database applications 102, engine A and engine B, transact with a database 104 connected with a server 106 of a server system 108. Engine A and engine B maintain separate log volumes, such that when a transaction updates, both table A and table B, of engine A and engine B respectively, one part of the log is assigned to an A log file and another part is assigned to a B log file. The database applications 102 may host two separate transactional engines, engine A and engine B, or may run on more than one physical instance, i.e. on two separate computing machines.

Figure 2:
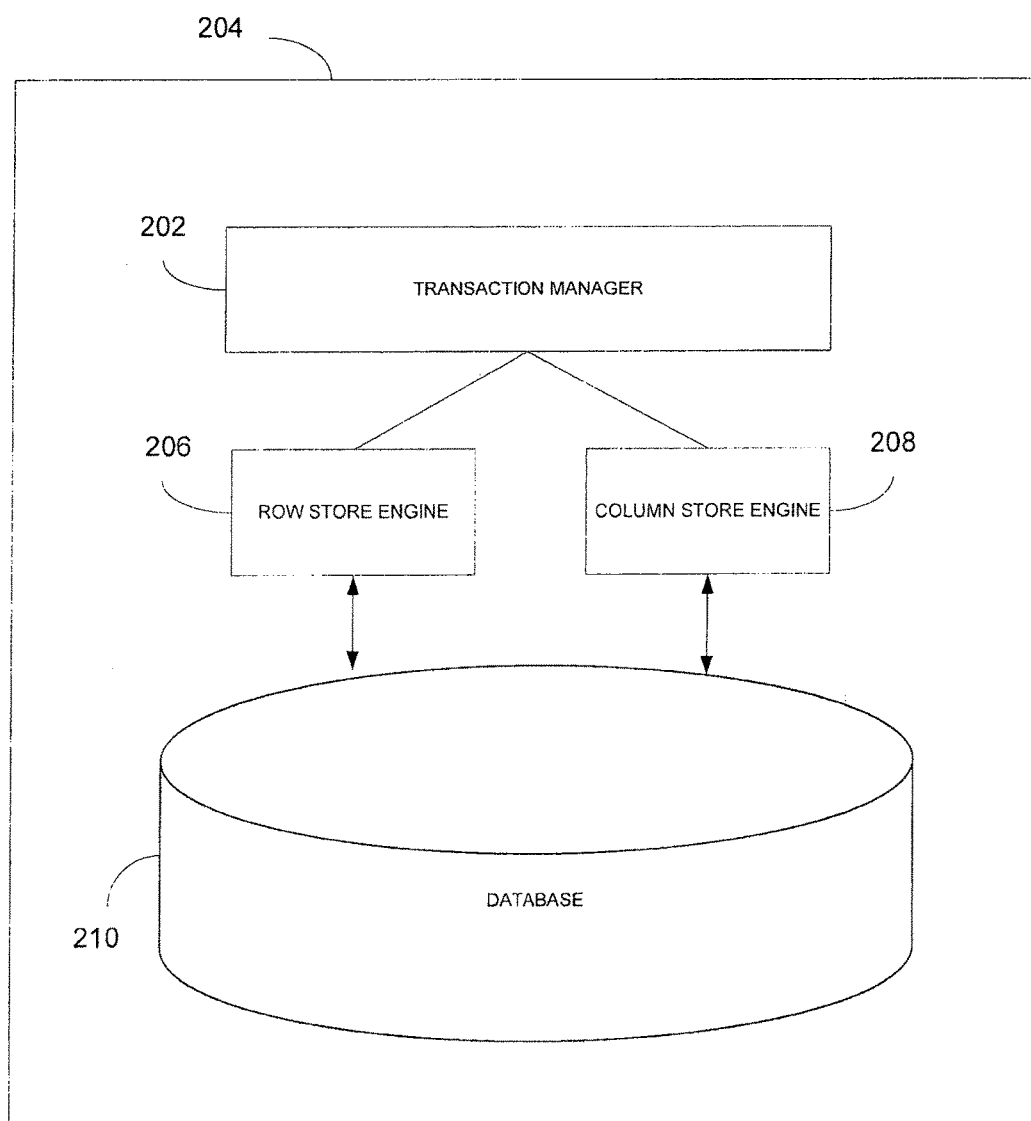
FIG. 2 shows a system for managing distributed transactions of a database.

FIG. 2 illustrates a system 200 for managing distributed transactions of a database 210. The system 200 is preferably implemented on a server 202 that is connected with or which hosts the database 210. The system 200 includes a transaction manager 202. The transaction manager 202 is configured to support full ACID properties for transactions, multi-version concurrency control, and transactional consistency across the column and row storage engines 206 and 208, respectively. The transaction manager 202 also supports distributed (i.e. multi-instance update) transactions, and can generate an in-doubt transaction list for atomic multi-host transaction commits. The transaction manager 202 for the database 210 operates according to the functions described below.

Figure 3:
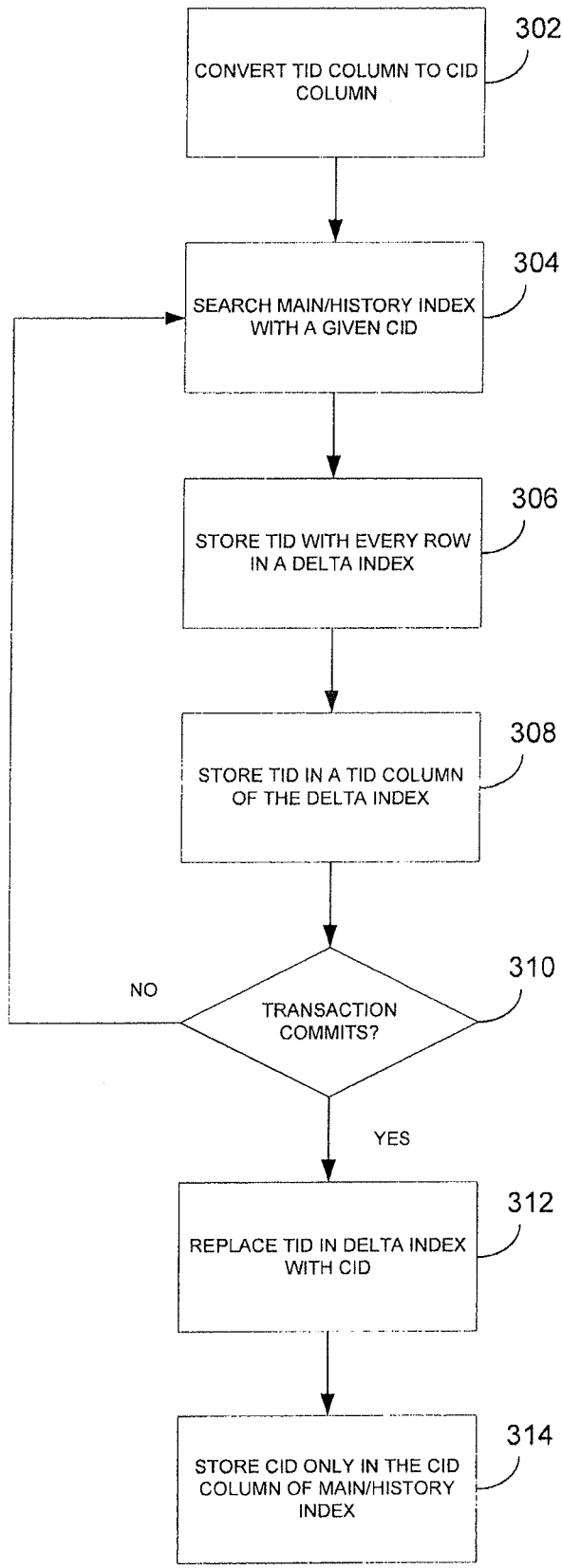
FIG. 3 is a flowchart of a method of distributed transaction management with tokens.

As shown in FIG. 3, which is a flowchart showing distributed transaction management with tokens, concurrent insert/update/delete work is handled by the TM with record-level locking as follows. At 302, the TID column is converted to a CID column. At 304 the main/history index is searched directly with a given CID. At 306, the TID is stored with every row in a delta index, and at 308 the TID is stored in a TID column of the delta index. At 310, it is determined whether the transaction commits. If so, at 312 the TID is replaced by a CID. In the TID/CID column, one bit is used to flag whether the identifier is a TID or a CID. Finally, in the CID column of the main/history index, only the CID is stored, at 314.

The delta index TID/CID column and main/history index CID column are persistent data structures. To ensure persistency of the delta index TID/CID column without additional disk input/outputs (I/Os), the transaction commit log entry is extended. Every transaction starts as a read transaction. The first write operation checks whether the transaction is already a write transaction or if it has to be changed to a write transaction. If the transaction is not already a write transaction, the TM sets a new TID for write operations to the transaction token. Either the row store engine or the column store engine can use a transaction token to provide a consistent view of the data.

The token generated by each TM carries the following information:
- nextWriteTID: TID<0 indicates a read-only transaction, so that TID>0 can be used for write operations. A running read-only transaction can transform the token into a read token by calling the TM. A running transaction will not see changes made by the transaction with TID>nextWriteTID.
- minReadTID: All transactions with TID<minReadTID are closed (i.e. either committed or rolled back). The row store engine and the column store engine do not need to hold any data changed by a transaction with TID<minReadTID, and therefore minReadTID can be used to collect garbage data.
- minWriteTID: All write transactions with TID<minWriteTID are closed. The transaction with minWriteTID sees at least all changes made by transactions with TID<minWriteTID.
- maxCID: the CID given to the last commit. This transaction should see all changed data with TID<maxCID. The database can use the maxCID to run searches on the main/history index.

Since the transaction token contains the maximum CID that should be shown to the application, searching on the main/history index is simplified if the given CID is less than the last CID seen at merge time.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for managing transactions of a database, the method comprising:
   generating, by a transaction manager, a transaction token specifying that changes to the database by some of a plurality of transactions are visible to a transaction associated with the transaction manager and that changes to the database by others of the plurality of transactions are not visible to the transaction associated with the transaction manager, the transaction token including a maximum visible computed identifier that identifies a plurality of committed transactions and a plurality of uncommitted transactions; and
   performing record-level locking of a first record in a plurality of records of the database using the transaction token to execute the transaction by generating a main/history index of the plurality of records in the database as a persistent data structure, the main/history index having a computed identifier column, generating a delta index having rows and columns, storing a transaction identifier (TID) associated with one or more records in the plurality of records in the database in every row and in a TID column of the delta index, and for each uncommitted transaction of the first record that becomes committed replacing the TID associated with the first record in the TID column of the delta index with a computed identifier and storing only the computed identifier in the main/history index persistent data structure.

2. The computer-implemented method in accordance with claim 1, wherein the transactions of the database are distributed transactions.

3. A system comprising:
   at least one data processor;
   memory storing instructions which, when executed by the at least one data processor, causes the at least one data processor to perform operations comprising:
   generating, by a transaction manager, a transaction token specifying that changes to the database by some of a plurality of transactions are visible to a transaction associated with the transaction manager and that changes to the database by others of the plurality of transactions are not visible to the transaction associated with the transaction manager, the transaction token including a maximum visible computed identifier that identifies a plurality of committed transactions and a plurality of uncommitted transactions; and
   performing record-level locking of a first record in a plurality of records of the database using the transaction token to execute the transaction by generating a main/history index of the plurality of records in the database as a persistent data structure, the main/history index having a computed identifier column, generating a delta index having rows and columns, storing a transaction identifier (TID) associated with one or more records in the plurality of records in the database in every row and in a TID column of the delta index, and for each uncommitted transaction of the first record that becomes committed replacing the TID associated with the first record in the TID column of the delta index with a computed identifier and storing only the computed identifier in the main/history index persistent data structure.

4. The system of claim 3, wherein the transactions of the database are distributed transactions.

5. A non-transitory computer program product storing instructions, which when executed by at least one data processor of at least one computing system, implement a method comprising:

generating, by a transaction manager, a transaction token specifying that changes to the database by some of a plurality of transactions are visible to a transaction associated with the transaction manager and that changes to the database by others of the plurality of transactions are not visible to the transaction associated with the transaction manager, the transaction token including a maximum visible computed identifier that identifies a plurality of committed transactions and a plurality of uncommitted transactions; and performing record-level locking of a first record in a plurality of records of the database using the transaction token to execute the transaction by generating a main/history index of the plurality of records in the database as a persistent data structure, the main/history index having a computed identifier column, generating a delta index having rows and columns, storing a transaction identifier (TID) associated with one or more records in the plurality of records in the database in every row and in a TID column of the delta index, and for each uncommitted transaction of the first record that becomes committed replacing the TID associated with the first record in the TID column of the delta index with a computed identifier and storing only the computed identifier in the main/history index persistent data structure.

6. The computer program product of claim 5, wherein the transactions of the database are distributed transactions.

* * * * *